United States Patent [19]

Yamamoto et al.

[11] Patent Number: 5,075,704
[45] Date of Patent: Dec. 24, 1991

[54] FILM FLATNESS KEEPING DEVICE

[75] Inventors: Masaru Yamamoto; Yoshinobu Tanaka, both of Tokyo, Japan

[73] Assignee: Kyocera Corporation, Kyoto, Japan

[21] Appl. No.: 616,222

[22] Filed: Nov. 20, 1990

[30] Foreign Application Priority Data

| | | | |
|---|---|---|---|
| Nov. 21, 1989 | [JP] | Japan | 1-302458 |
| Dec. 13, 1989 | [JP] | Japan | 1-323192 |
| Dec. 26, 1989 | [JP] | Japan | 1-339153 |

[51] Int. Cl.$^5$ .................. G03B 17/00; G03B 17/24
[52] U.S. Cl. .................................... 354/105; 354/203
[58] Field of Search .................. 354/105, 106, 203; 355/73, 76

*Primary Examiner*—Michael L. Gellner
*Attorney, Agent, or Firm*—Spensley Horn Jubas & Lubitz

[57] ABSTRACT

A film is placed on a front surface of a pressure plate. The pressure plate has, at its central portion, a plurality of small through-holes through which the film is sucked to provide sufficient flatness of the film during each exposure. A closed variable space is formed in the rear of the pressure plate by a variable container including the central portion of the pressure plate. The film is sucked by increasing the volume of the closed variable space by means of an electromagnetic actuator which comprises a moving coil mounted on the variable container at its rear side and a fixed permanent magnet providing a magnetic field for interaction with the moving coil. The actuator is driven by a drive circuit.

9 Claims, 9 Drawing Sheets

5,075,704

FILM FLATNESS KEEPING DEVICE

BACKGROUND OF THE INVENTION

The present invention relates to a film flatness keeping device of a camera for properly keeping the flatness of a film at each exposure A film holder mechanism located in the film aperture portion of an ordinary camera of the type using a silver salt film is called a "tunnel system."

FIG. 10 shows a sectional view of a single-lens reflex camera including its optical axis. FIG. 11 is an enlarged sectional view showing the structure including a film, a film aperture portion, and a pressure plate The height of each of paired film rails 2 provided on the aperture side of a camera body is different from that of each of paired pressure plate rails 3 receiving a pressure plate 4, by normally 0.2 mm for the 35-mm film. The upper and lower ends of the film 21 are held by such gaps (tunnels), and the rear side of the film 21 is supported by the pressure plate 4. Accordingly, it is exposed while keeping the flatness of some degree Careful study of the tunnel system shows that unevenness of more than 80 µm may be created at the start and end portions of a film winding depending on its material Theoretically, any kind of film must have a portion warped and separated from the surface of the pressure plate 4 by ΔL within the film aperture portion (mainly in its central area), as shown in FIG. 11.

Practically, the separation ΔL is treated as a negligible matter, because it is within the depth of focus. However, the film flatness needs to be considered in cases where it is not a negligible factor in connection with ambient conditions, such as temperature and humidity, and material of a film, and where due to the use of a high performance lens photographing is made at a shallow depth of focus.

A large vacuum device or the like is often used for a special camera for the photoengraving. Such a large device, however, cannot be used for general portable cameras.

A film suction stabilizing mechanism for general portable cameras is disclosed in Japanese Utility Model Examined Publication No. Sho. 62-30019. In the mechanism, a mirror drive lever, which is turned in synchronism with a shutter release, drives an air dumper, to reduce a pressure within a cylinder. A suction tube coupled with the cylinder is connected to the rear surface of a pressure plate that is located on the back cover side of a camera. A film is sucked through small through-holes of the pressure plate. The mechanism is complicated because a mirror drive mechanism, specifically the cylinder, installed on the camera body side should be connected to the pressure plate on the back cover side by the suction tube.

A pressure plate device for keeping the film flatness at the time of photographing, which is used for a camera using a roll film, is disclosed in Japanese Utility Model Examined Publication No. Sho. 54-19863. In a mechanism of this device, an air chamber is provided on the rear side of a film pressure plate. The air chamber is hermetically enclosed by an expandable member, and is expanded by means of a motor and a link mechanism to reduce its internal pressure. To hold a film, it is sucked through small through-holes of the pressure plate. Use of the motor and link mechanism makes it difficult to provide satisfactory response speed.

SUMMARY OF THE INVENTION

Accordingly, an object of the present invention is to provide a film flatness keeping device which is adaptable for a portable camera and can provide satisfactory flatness of a film at each exposure.

According to the invention, a film flatness keeping device for a camera comprises:

a pressure plate having one or a plurality of through-holes in its central portion, a film being placed on a front surface of the pressure plate;

a variable container forming a closed variable space on the rear side the pressure plate, the central portion of the pressure plate being part of the variable container;

an electromagnetic actuator for increasing a volume of the closed variable space to suck the film through the through-holes; and an actuator drive circuit for driving the electromagnetic actuator.

DETAILED DESCRIPTION OF THE PREFERRED EMBODIMENTS

The present invention will be described in detail with reference to the accompanying drawings.

Figure 1:
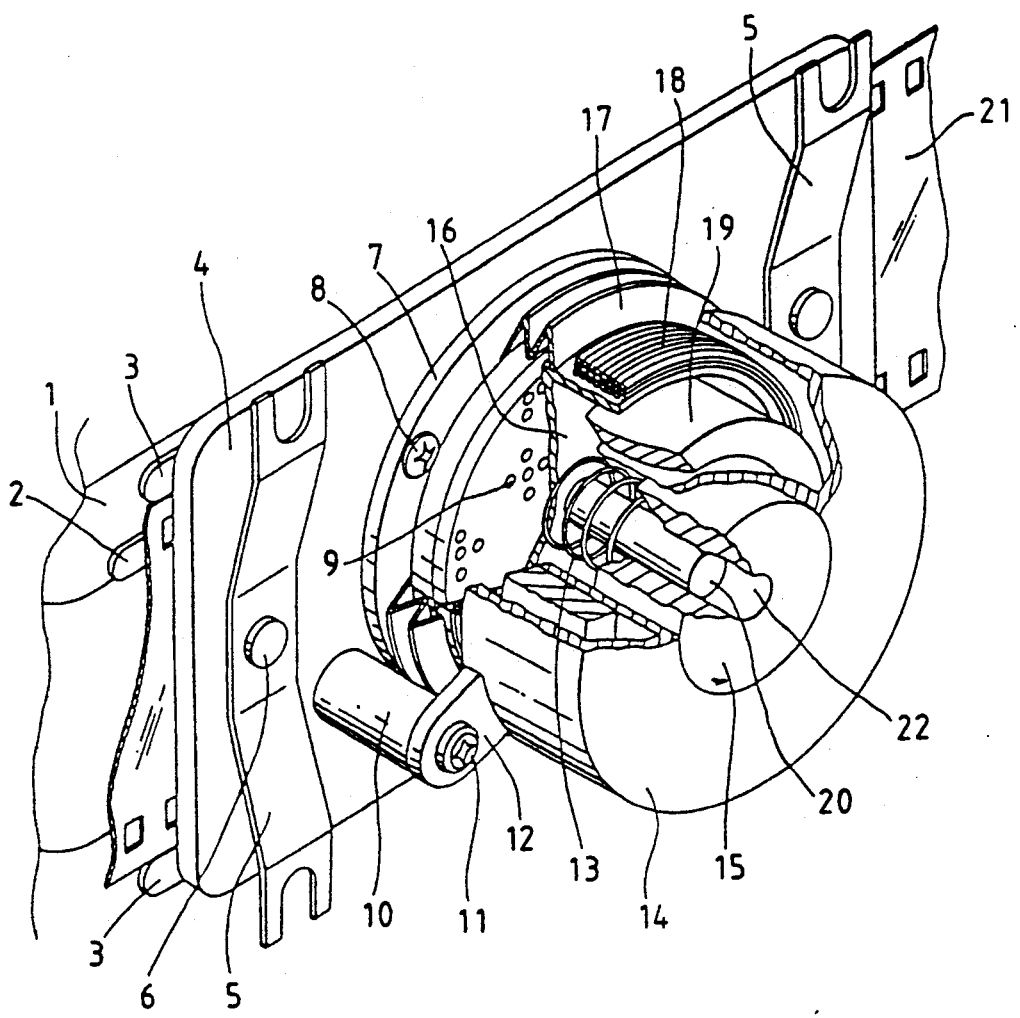
FIG. 1 is a perspective view showing a holding mechanism of a film flatness keeping device according to an embodiment of the present invention.

FIG. 1 is a perspective view showing a holding mechanism of a film flatness keeping device according to an embodiment of the present invention, when viewed from the rear side of a camera body. As shown, a pair of film rails 2 are disposed on the surface of a camera body 1 above and below a film aperture. A pair of pressure plate rails 3 are disposed outside the pair of the film rails 2. As well known, pressure plate springs 5 are fixed to a film pressure plate 4 by means of rivets 6, and the pressure plate 4 is mounted on a back cover 25 (see FIG. 4) of the camera by those springs 5. A plurality of through-holes 9 are formed in the central portion of the pressure plate 4. A ring-like fixing plate 7 is mounted on the rear surface of the pressure plate 4 by means of screws 8 so as to surround the through-holes 9. A cup 16 for sucking air is hermetically coupled with the fixing plate 7 through bellows 17. A circumferential yoke 14 is fixed to the pressure plate 4 by the combination of a stud 10, a screw 11, and a lug 12. A bearing 15 with a through-hole 22 is supported at the central portion of the circumferential yoke 14. A shaft 20 is fixed to the center of the cup 16, and is loosely fitted into the through-hole 22 of the bearing 15. A spring 13 is placed between the bearing 15 and the cup 16 so as to urge the assembly of the cup 16 and the bellows 17 toward the pressure plate 4 (The cup 16 can contact with the fixing plate 7.) A ring-like moving coil 18, which is provided around the cup 16, is partially placed in a gap between a ring magnet 19 and the yoke 14.

Figure 3:
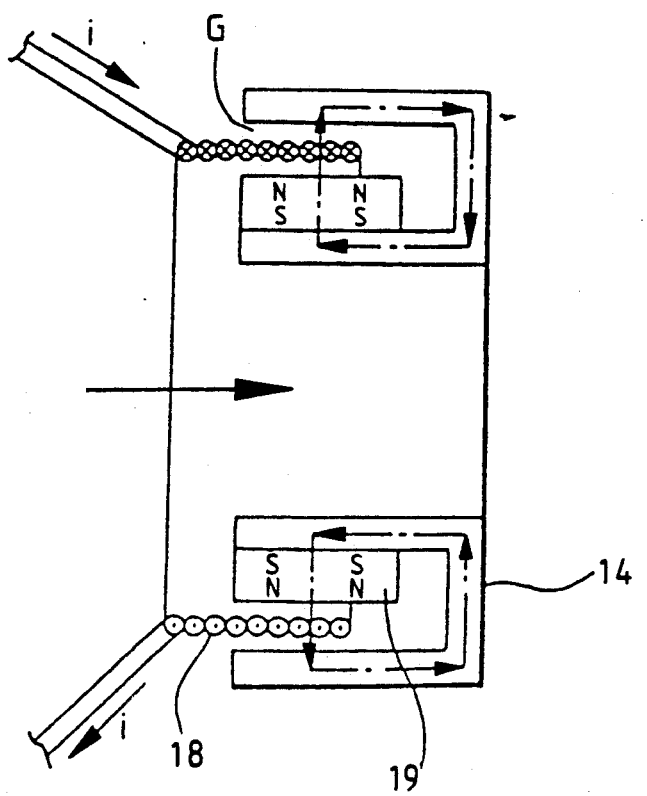
FIG. 3 shows an enlarged sectional view of an actuator portion of a film holding mechanism.

FIG. 3 is an enlarged sectional view of the above actuator portion of the film holding mechanism.

The ring magnet 19 is magnetized in the radial direction as shown in FIG. 3. Lines of magnetic force developed by the magnet 19 are radially emanated outward from the circumferential surface of the magnet 19. A gap G is formed between the outer circumferential surface of the ring magnet 19 and the inner circumferential surface of the outer rim of the yoke 14. With this structure, such a magnetic circuit is formed that the lines of magnetic force emanated from the magnet 19 pass through the yoke 14, and return to the inner surface of the magnet 19. Accordingly, a strong magnetic filed is developed in the gap G.

When a current i is fed into the moving coil 18 placed in the gap G in the direction shown in FIG. 3, a force is generated in the direction of the arrow of the figure according to the Fleming's left hand rule. The moving coil 18 is thus attracted toward the magnet 19. Accordingly, the cup 16, which is integral with the coil 18, retracts from the pressure plate 4 while resisting the spring 13. As a consequence, a space within a variable container as defined by the fixing plate 7, the pressure plate 4, the bellows 17, and the bottom face of the cup 16 is expanded, so that a pressure of the space becomes lower than the atmospheric pressure. Since, in response thereto, an air pressure between a film 21 and the pressure plate 4 also drops because of the existence of the through-holes 9 of the pressure plate 4, the film 21 is pressed against the surface of the pressure plate 4. By maintaining this suction, the film 21 kept in close contact with the surface of the pressure plate 4, to well keep the flatness of the film 21.

Figure 2:
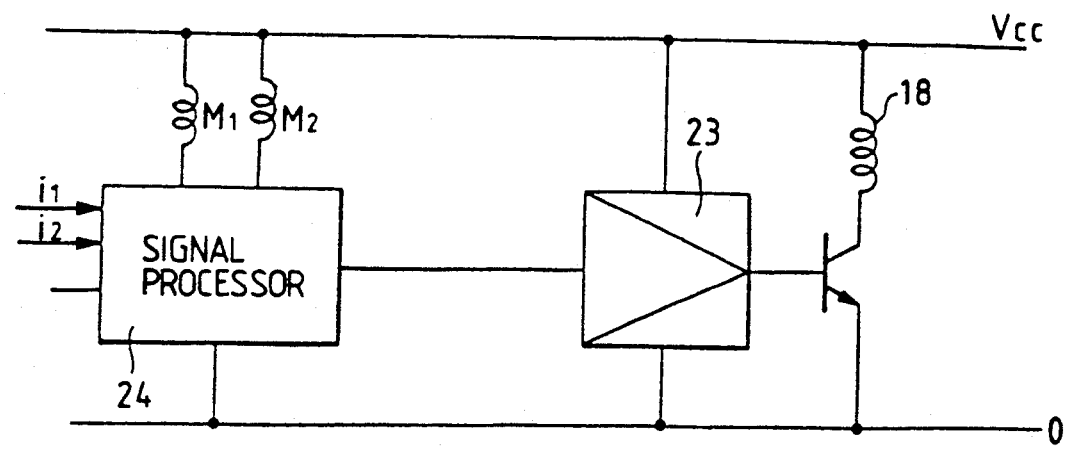
FIG. 2 shows an embodiment of an actuator drive circuit for driving a moving coil.

FIG. 2 shows an embodiment of an actuator drive circuit for driving the moving coil 18. The drive circuit stops providing a current to the coil 18 to release the film suction when the film 21 is being fed, so that the suction is effected only when the film 21 is exposed. When a start signal $i_1$ for the leading blade of the shutter is input to a signal processor 24 a current is fed to the coil 18 with the aid of an amplifier 23 and a transistor, so that the film 21 is attracted. A signal $i_2$ representative of the completion of the trailing blade running, which is generated upon completion of an exposure, stops the current feed to the coil 18. In this way, by the drive circuit, the combination of the attraction of the film 21 toward the pressure plate 4 and its release is cyclically repeated in accordance with a camera operation sequence. Reference marks M1 and M2 represent a leading blade control coil and a trailing blade control coil, respectively.

Figure 4:
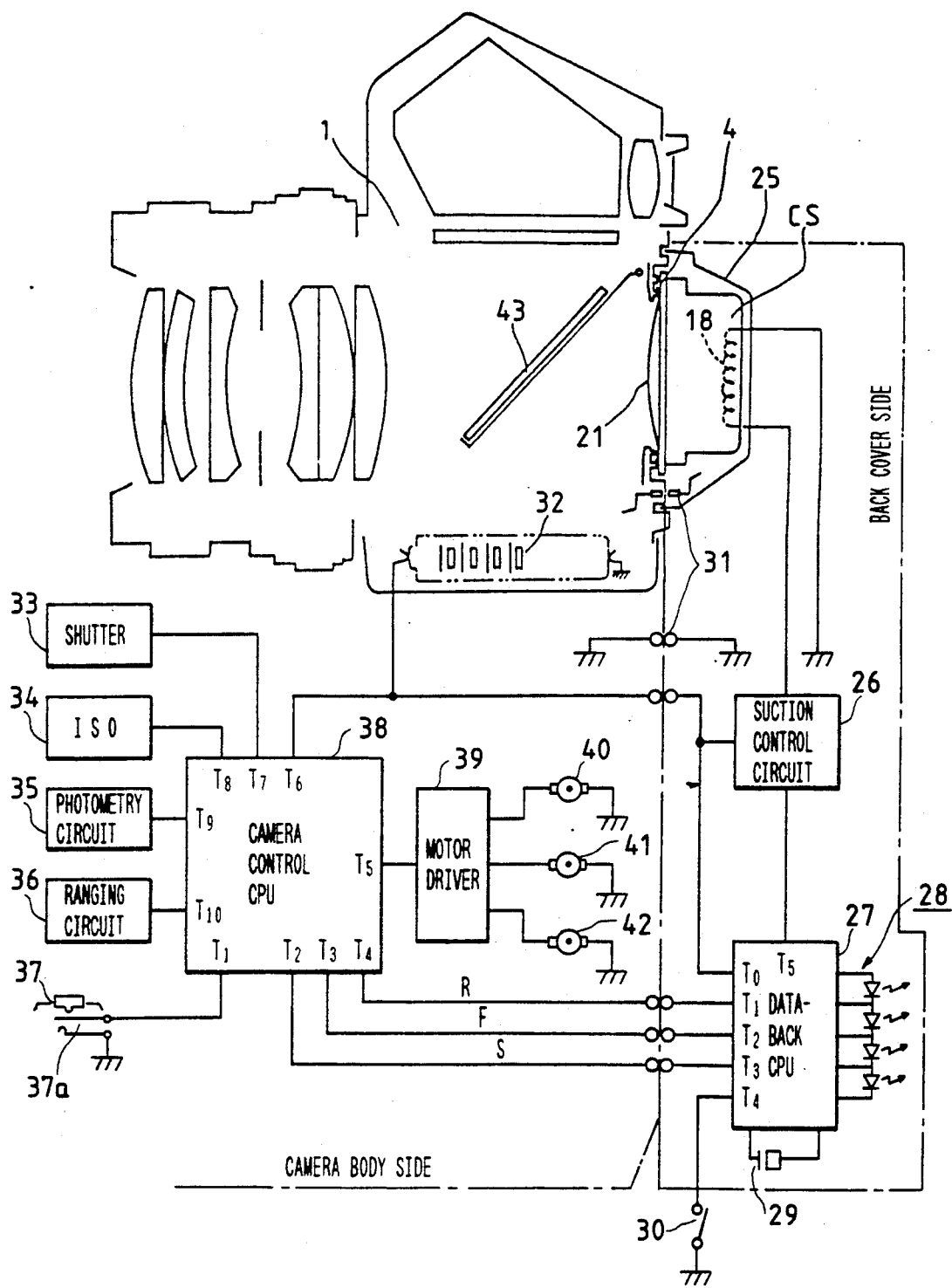
FIG. 4 shows, in block and schematic form, an embodiment of a film flatness keeping controller circuit.

FIG. 4 shows, in block and schematic form, an embodiment of a film flatness keeping controller circuit.

The closed variable space CS defined by the fixing plate 7, the pressure plate 4, the bellows 17, and the yoke 14, which has been described in connection with FIG. 1, is located on the rear side of the pressure plate 4, and is disposed within the back cover 25.

The moving coil 18 to expand the closed variable space CS is connected to the output terminal of a suction control circuit 26, which is connected to the output terminal $T_5$ of a data-back CPU 27.

The CPU 27 contains light-emitting elements 28 and a back-up battery 29, and is coupled at the input terminal $T_4$ with a data superimposing instruction switch 30. Terminals $T_1$, $T_2$ and $T_3$ respectively receive a release signal R, a film sensitivity signal F, and a shutter operation completion signal S through contact terminal pairs 31. A terminal $T_0$ is supplied with power from a battery 32 equipped in the camera body 1. The contact terminal pairs 31 are separated from each other when the back cover 25 is open. When it is closed, the terminal pairs 31 come in contact with each other to connect circuits of the camera body side and those of the back cover side.

The camera body 1, in spaces not shown in the figure, a shutter 33, film sensitivity detector (ISO) 34, photometry circuit 35, ranging circuit 36, release button 37, camera control CPU 38, motor driver 39, motor 40 for feeding the film 21, motor 41 for lifting a mirror 43 by its forward rotation, and for returning the same and charging the shutter 33 by its reverse rotation, motor 42 for rewinding the film 21, and other components.

Figure 5:
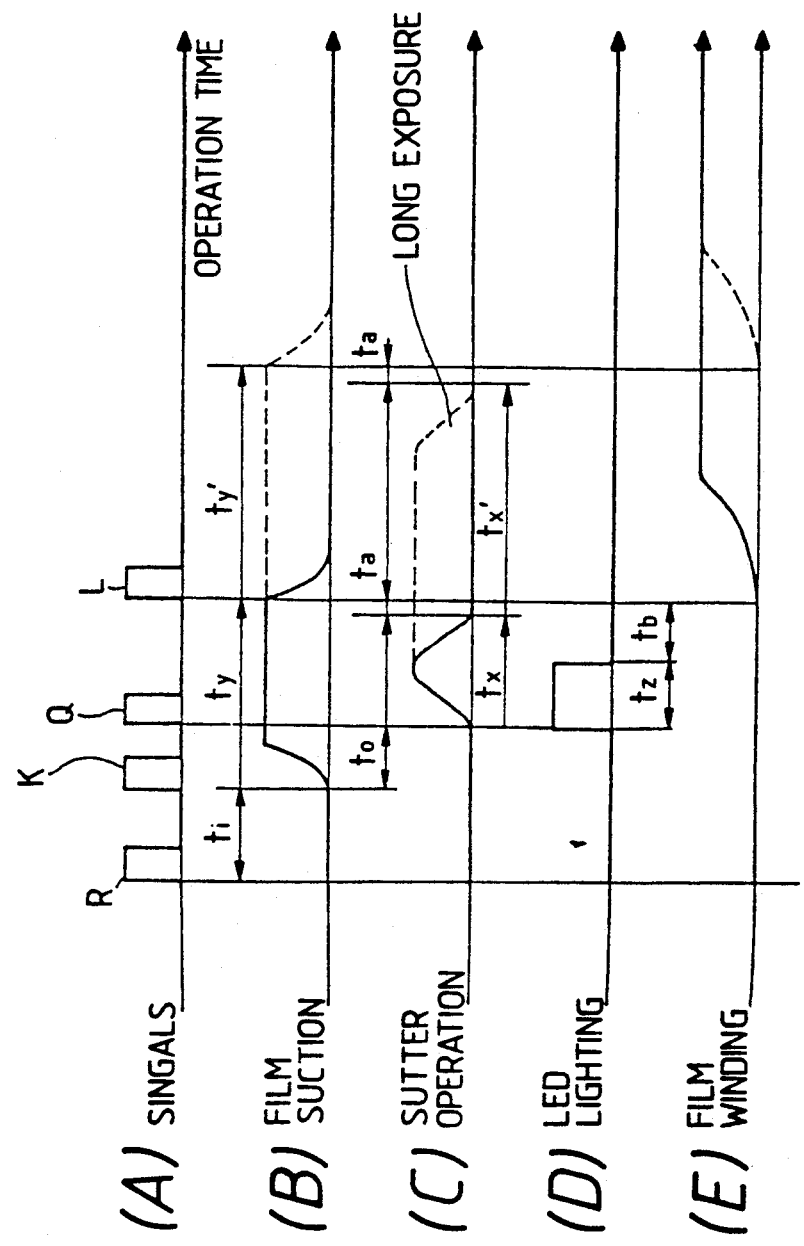
FIG. 5 is a timing chart for explaining the operation of the controller circuit of FIG. 4.

The operation of the film flatness keeping controller circuit thus arranged will be described with reference to FIGS. 4 and 5.

In FIG. 4, when the release button 37 is pushed, the switch 37a is closed to allow a start signal to go to the terminal $T_1$ of the camera control CPU 38. In response to this, the CPU 38 sends a signal to a motor derive 39 to forwardly turn the motor 41. With the forward rotation, the motor 41 lifts the motor 43. On the other hand, the CPU 38 sends a release signal R form its output terminal $T_4$ to the input terminal $T_1$ of the CPU 27 (FIG. 5A). Upon receipt of the release signal R, the CPU 27 sends a movable coil drive signal K to the suction control circuit 26 after a fixed time lag $t_1$ (FIG. 5A). In response to the receipt of the signal K, the suction control circuit 26 feeds a current to the moving coil 18 to attract the film 21 (FIG. 5B). Defining $t_0$ as a period necessary for the film 21 to be completely attracted, the shutter 33 starts to operate after $t_1 + t_0$ from the sending of the release signal R (FIG. 5C). Therefore, the motor 41 lifts the mirror 43 out of the photographing optical path in the period $t_1 + t_0$. Meanwhile, the CPU 27, which has received the release signal R, sends a data superimposing signal Q to light up the light-emitting elements 28 during a period $t_z$ (FIG. 5D).

When the shutter 33 is closed to provide a shutter operation completion signal to the terminal $T_7$ of the CPU 38, the CPU 38 sends the shutter operation completion signal S from its terminal $T_2$ to the terminal $T_3$ of the CPU 27. The CPU 27 having received the signal S sends a coil drive stop signal L to the suction control circuit 26 after a time lag $t_a$ that is required for the shutter 33 to complete its closing, that is, after a time lag $t_b$ that is required for completion of the data superimposing (FIG. 5A). Upon receiving the signal L, the suction control circuit 26 stops feeding the current to the moving coil 18 (FIG. 5B).

The CPU 38, which has received the shutter operation completion signal from the shutter 33 reversely turns the motor 41 through the motor driver 39 after the time lag $t_a$ required for the complete closing of the shutter 33 plus a subsequent time required for completion of the suction operation by the moving coil 18. When the motor 41 is reversely turned, the mirror 43 is returned to its initial position by a mechanism (not shown). The motor 40 also turns to wind up the film 21 (FIG. 5E).

As described above, the film flatness keeping device of the above embodiment comprises: a pressure plate of a camera having small through-holes in the central portion; a variable container forming a closed variable place on the rear side of the central portion of the pressure plate; an electromagnetic actuator for expanding the volume of the variable container; and an actuator drive circuit for driving the electromagnetic actuator. Thus, a portable camera, when incorporating the film flatness keeping device of the above embodiment can automatically provide the film flatness before each exposure, with a simple construction.

Figure 6:
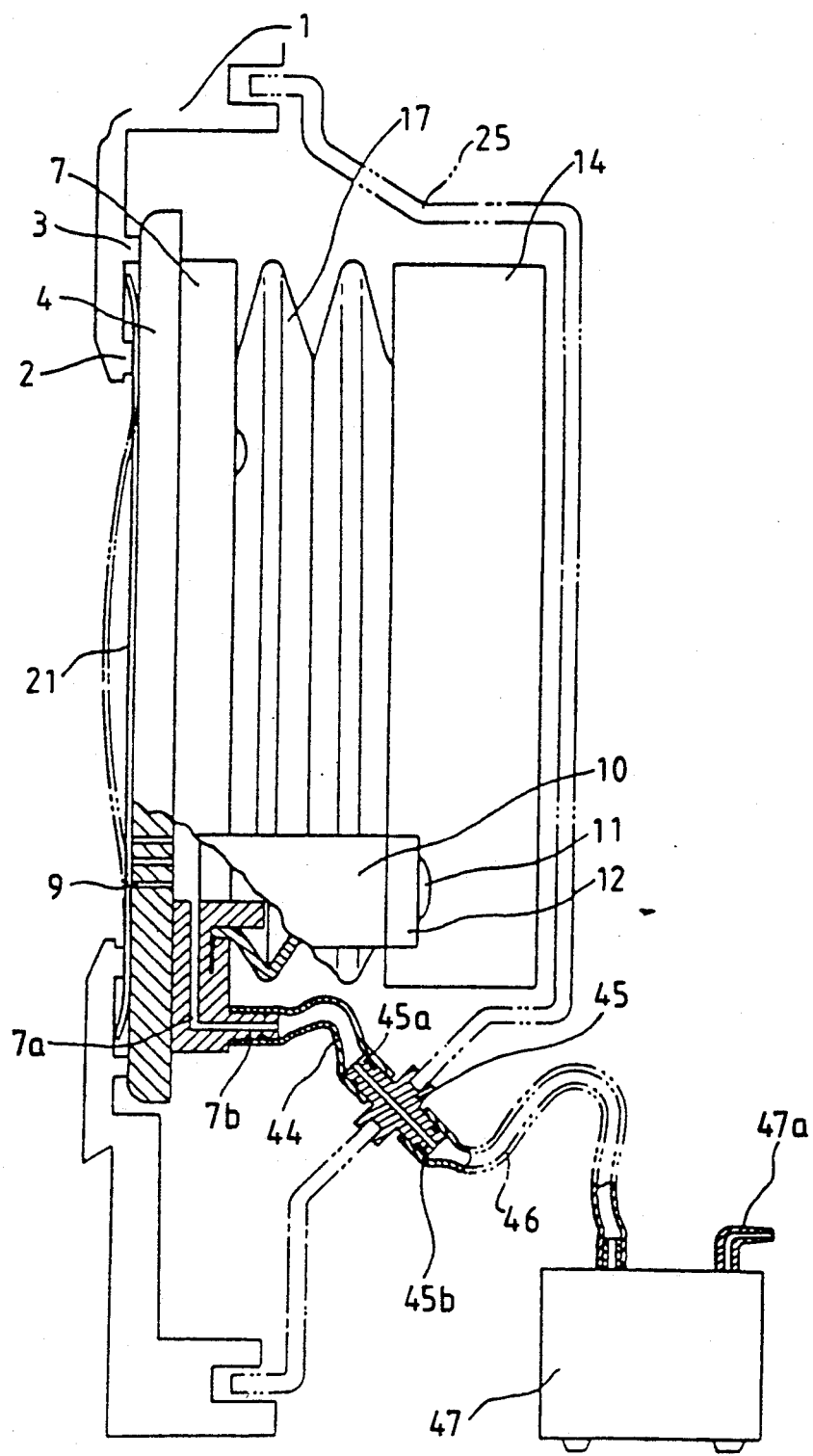
FIG. 6 shows a structure of a film flatness keeping device according to another embodiment of the invention in which an external air suction unit is connected to a camera through an air inlet.

FIG. 6 shows a structure of a film flatness keeping device according to another embodiment of the invention in which an external air suction unit is connected to a camera through an air inlet.

A fixing plate 7 is mounted on a pressure plate 4 that is disposed on a back cover 25 by a suitable means (not shown). An air inlet 7b having an air path 7a is protruded from the bottom of the fixing plate 7. The air inlet 7b is coupled, through a tube 44, with a first opening portion 45a of an external suction port 45. A second opening portion 45b is coupled, through another tube 46, with an air suction unit 47. The tube 46 is removable from the second opening portion 45b. When the suction unit 47 is not used, the second opening portion 45b is closed with a cap (not shown). Reference number 47a designates an exhaust pipe. There are two methods to take a photograph by using the air suction unit 47.

The first method is used for compensating for a reduction of a suction force which is caused by air leakage when a film 21 is attracted by the suction by the actuator described above. In this method, the suction unit 47 is weakly operated in synchronism with the release operation so as to assist the suction by the actuator. After each exposure, the actuator operation is stopped and only the suction unit 47 remains to operate. However, since its suction force on the film 21 is weak, it does not hinder winding the film 21.

In the second method, when the film 21 is would up after a previous exposure, a switch (not shown) is operated to render the actuator inoperable, while the air suction unit 47 is strongly operated to attract the film 21. After the exposure, the air suction unit 47 is stopped.

As described above, the film flatness keeping device of the instant embodiment is operable in any of the following three modes. In the case where an exposure time is shorter than a suction time, e.g., 2 sec., which depends on a degree of air leakage, the use of the actuator suffices. In the case where the exposure time is long, the combination of the actuator and the air suction unit 47 or only the suction unit 47 is used.

Figure 7:
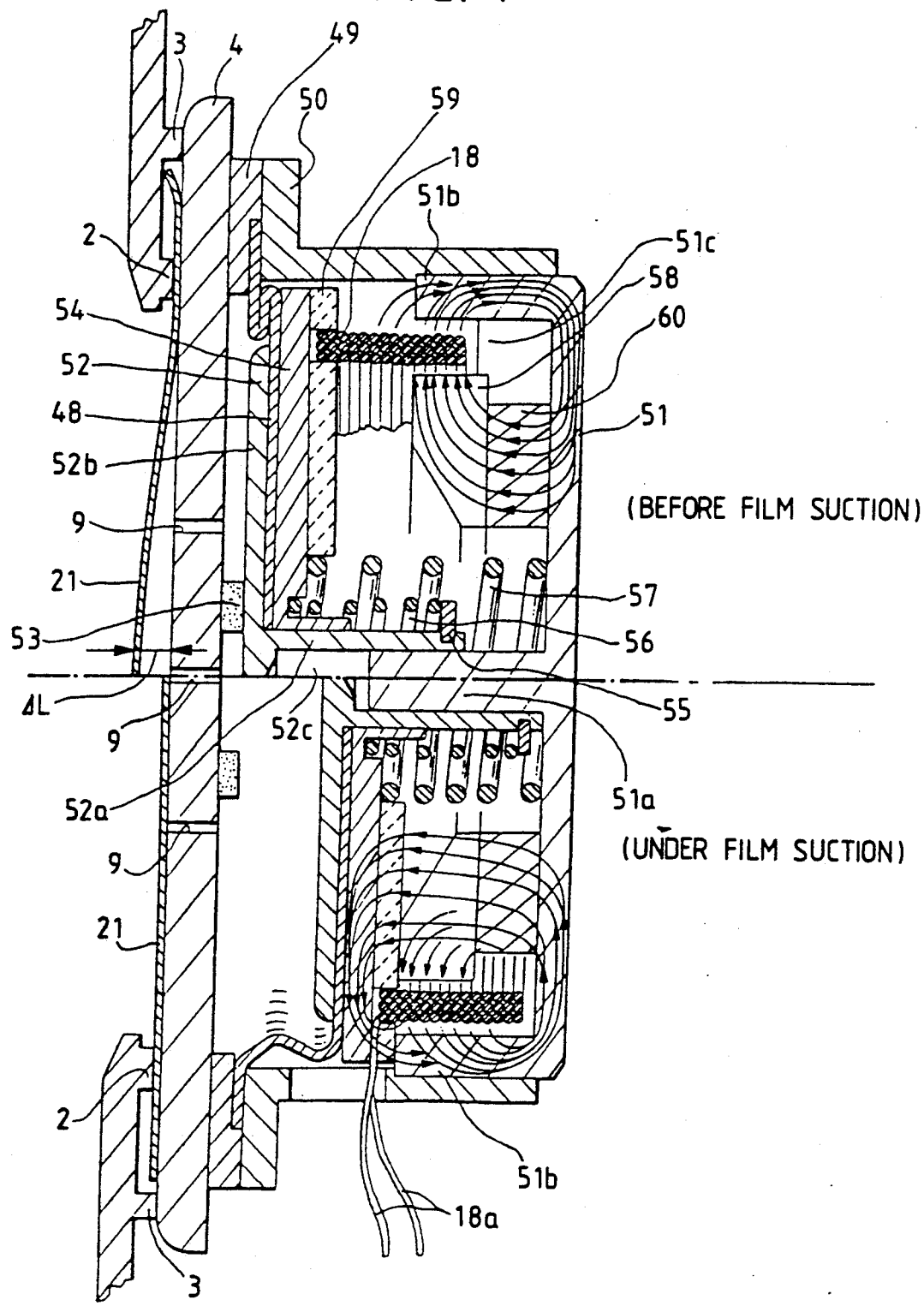
FIG. 7 is a sectional view showing a holding mechanism of a film flatness keeping device according to another embodiment of the present invention.

FIG. 7 is a sectional view showing a holding mechanism of a film flatness keeping device according to another embodiment of the present invention. The illustration of the device above the center line shows a state of the device before the film attraction, while the illustration below the center line shows a state of the device under the film attraction.

A pressure plate 4 mounted on a back cover (not shown) of a camera is pressed against a pair of upper and lower rails 3 disposed on a plane in which a film aperture is provided. The upper and lower ends of a film 21 are confined by the pressure plate 4 and a pair rails 2 which are disposed inside the paired rails 3. A number of through-holes 9, which serve to attract the film 21 by air suction, are provided in the central portion of the pressure plate 4. The circumferential edge of a suction rubber 48, which defines a closed variable space, is hermetically fixed to the rear surface of the pressure plate 4 by means of a suction rubber mounting member 49, while surrounding a group of the through-holes 9. A case side member 50 is mounted on the mounting member 49 on which the suction rubber 48 is fixed. A case back cover 51 is fixed onto the inside of the case side member 50. The case back cover 51 includes a shaft 51a in the central portion and a tubular portion 51b serving as part of a yoke.

A bering portion 52a of a suction disc 52 is inserted through a hole located in the central portion of the suction rubber 48. The suction disc 52 consists of a circular portion 52b and the bering portion 52a projected from the circular portion 52. The circular portion 52b is bonded to the suction rubber 48. The bearing portion 52a has an elongated hole 52c which slidably receives the shaft 51a of the case back cover 51. A spacer 53 provided on the rear side of the pressure plate 4 buffers the suction disc 52 when it returns to the original position. A ferromagnetic drive disc 54 entirely covers the rear side of the suction rubber 48 and is fitted around the bering portion 52a. A spring 56 is inserted between the drive disc 54 and an E ring 55 which is mounted on the end of the bering portion 52a. The spring 56 transfers a motion of the drive disc 54 to the suction disc 52. Another spring 57 is placed between the case back cover 51 and the drive disc 54 and outside of the spring 56. Under the repulsion force of the spring 57, the drive disc 54 urges the suction rubber 48 and the suction disc 52, which are bonded to each other, to the spacer 53.

A ring-like moving coil 18 is fixed to the drive disc 54. A spacer 59 is further mounted on the same. The spacer 59 serves as a buffer member when it hits a yoke 58 (described later), etc., and provides a magnetic gap. A magnetic circuit forming section contains the case back cover 51, a ring-like permanent magnet 60 mounted on the inside of the case back cover 51, and the ring-shaped yoke 58 mounted on the permanent magnet 60. The rear end of the moving coil 18 is positioned somewhat inside the opening portion 51c of the magnetic circuit forming section when no suction is made. When the suction is effected, the rear end of the moving coil 18 is fully inserted into the opening portion 51c, and the drive disc 54 hits the side wall of the yoke 58 and the end face of the tubular portion 51b of the case back cover 51.

Figure 8:
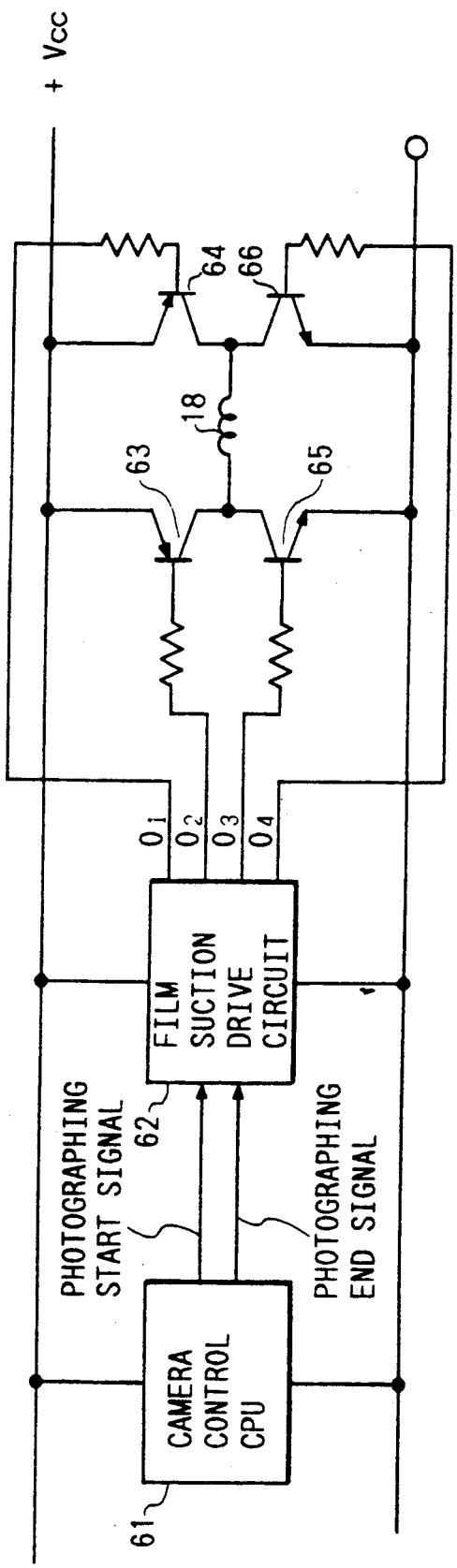
FIG. 8 is a block diagram showing an embodiment of a drive circuit for operating the film flatness keeping mechanism of FIG. 7.

FIG. 8 is a block diagram showing an embodiment of a drive circuit for operating the above film flatness keeping mechanism.

The drive circuit releases the film suction when the film is fed, and allows the film suction only when the film is exposed. In operation, first a camera control CPU 61 produces a photographing start signal. In response to this, a film suction drive circuit 62 produces a negative signal at an output terminal $O_2$ and a positive signal at an output terminal $O_4$. Transistors 63 and 66 are thereby rendered conductive and a current flows through the moving coil 18 in the direction of the arrow directed to the right. When receiving a photographing end signal from the camera control CPU 61, the film suction drive circuit 62 produces a negative signal at an output terminal $O_1$ and a positive signal at an output terminal $O_3$. Transistors 64 and 65 are thereby rendered conductive, and a current flows through the moving coil 18 in the direction of the arrow directed to the left.

Figure 9:
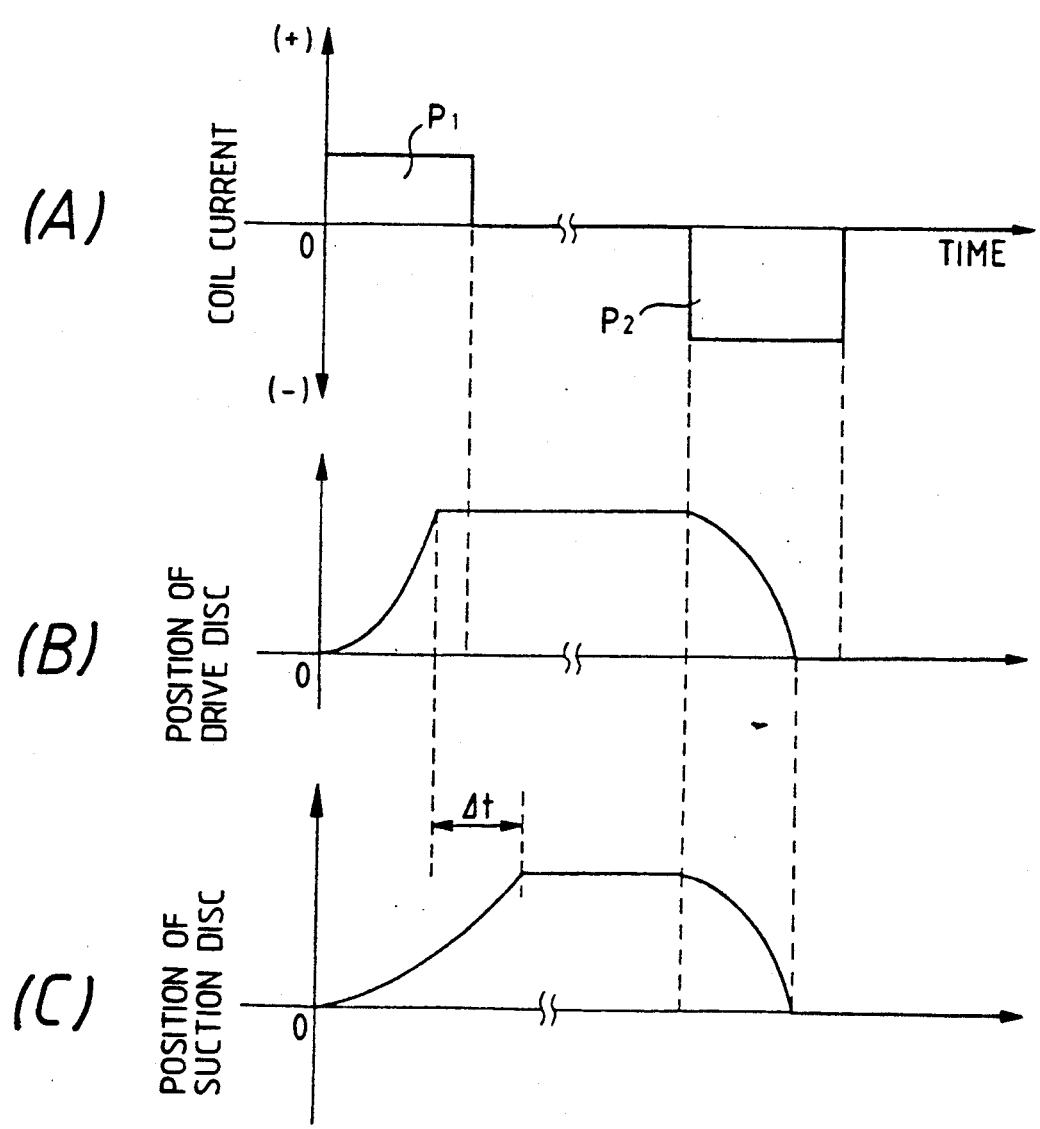
FIG. 9 is a set of waveforms for explaining the operation of the film flatness keeping mechanism of FIG. 7.
Figure 10:
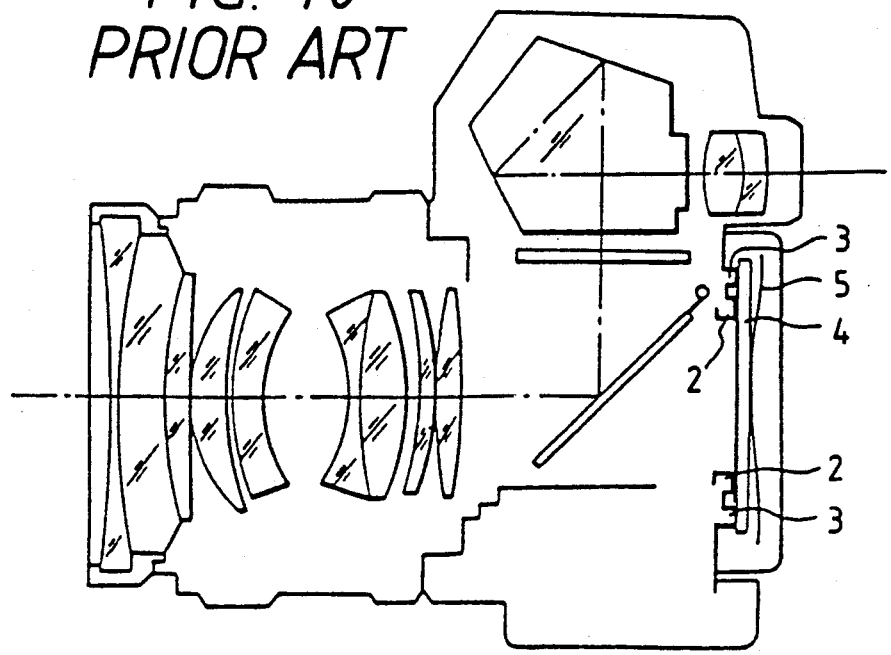
FIG. 10 shows a sectional view of a single-lens reflex camera including its optical axis.
Figure 11:
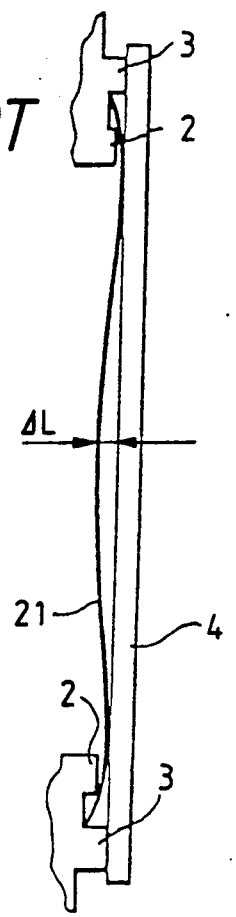
FIG. 11 is an enlarged sectional view showing the structure including a film, a film aperture portion, and a pressure plate.

FIG. 9 is a set of waveforms for explaining the operation of the film flatness keeping mechanism shown in FIG. 7.

Just before the film exposure, as shown by the illustration above the center line in FIG. 7, the gap between the drive disc 54 and the tubular portion 51b is large. The repulsion force of the spring 57 is greater than the attractive force acting from the yoke 58 and the tubular portion 51b to the drive disc 54. Under this condition, the suction disc 52 keeps the gap of the spacer 53 from the pressure plate 4, and the film 21 is not attracted to the pressure plate 4.

When the transistors 63 and 66 are turned on by the drive circuit 62, a one-shot pulse $P_1$ is applied as shown in FIG. 9A. Since a magnetic circuit is formed routing the yoke 58 → moving coil 18 → tubular portion 51b of the case back cover → permanent magnet 60 → yoke 58, the moving coil 18 receives an attraction force toward the opening portion 51c. Since this attraction force is greater than the repulsion force of the spring 57, the drive disc 54 moves to the right (FIG. 9B). A motion of the drive disc 54 is transferred through the spring 56 to the suction disc 52. With the movement of the drive disc 54, the suction rubber 48 is pulled and gradually moves apart form the pressure plate 4. After a prescribed delay $\Delta t$, the suction force applied to the film 21 reaches a peak (FIG. 9C).

As a result, as shown by the illustration below the center line in FIG. 7, the drive disc 54 is attracted to the yoke 58 and the end of the tubular portion 51b of the case back cover 51. Although the supply of the pulse $P_1$ to the moving coil 18 has already been stopped, the drive disc 54 remains attached to the yoke 58 and the tubular portion 51b, because a magnetic circuit is formed, by the existence of the ferromagnetic drive disc 54, mainly having the path of yoke 58 → spacer 59 → drive disc 54 → spacer 59 → tubular portion 51b of the case back cover 51 → permanent magnet 60 → yoke 58. Since the drive disc 54 is ferromagnetic, the lines of magnetic force never leak to the film 21.

Upon application of a one-shot pulse $P_2$, a repulsion force against the attraction keeping force by the permanent magnet 60 acts on the moving coil 18. The total repulsion force by the moving coil 18 and the spring 57 becomes larger than the attraction force by the magnet 60. As the gap between the spacer 59 and yoke 58 becomes wide, the attraction force becomes weak. Thus, the repulsion force of the spring 57 moves the drive disc 54 to the left, and returns it to the original position.

As understood from the foregoing description, in the film flatness keeping device according to the third embodiment of the invention, a suction disc is bonded to a suction rubber forming a closed variable space. A ferromagnetic drive disc, on which a moving coil is mounted, entirely covers the suction rubber. The drive disc is coupled through a spring with the suction disc. The drive disc is urged toward a pressure plate by another spring so as to be pressed against the suction rubber except during an exposure. At the time of the film exposure, a one-shot pulse current is fed to the moving coil. Through the interaction between the moving coil and the magnetic circuit formed by a magnetic circuit forming section, the moving coil is attracted to expand the closed variable space. When the current feeding is stopped, the attractive force developed by the magnetic circuit including the magnetic circuit forming section and the ferromagnetic drive disc sustains the expanded state of the variable space. After the film exposure, another one-shot pulse current is fed to the moving coil in the direction opposite to the above. A repulsion force is thereby developed, which is stronger than the attraction force. The repulsion force expands a magnetic gap between the drive disc and the magnetic circuit forming section, to weaken the attraction force. Since the attraction force becomes weaker than the repulsion force by the spring, the drive disc is returned to the original position. With such an arrangement, at each exposure, it suffices that the drive current is fed only at the start and the end of the film suction. That is, no current feeding is required during the film suction, reducing electric power consumption.

What is claimed is:

1. A film flatness keeping device for a camera, comprising:
    a pressure plate having one or a plurality of through-holes in its central portion, a film being placed on a front surface of the pressure plate;
    a variable container forming a closed variable space on the rear side the pressure plate, the central portion of the pressure plate being part of the variable container;
    an electromagnetic actuator for increasing a volume of the closed variable space to suck the film through the through-holes; and
    an actuator drive circuit for driving the electromagnetic actuator.

2. The device according to claim 1, wherein the electromagnetic actuator comprises a moving coil mounted on the variable container at its rear side and a fixed permanent magnet providing a magnetic field for interaction with the moving coil.

3. The device according to claim 2, wherein the actuator drive circuit continues to provide a drive current to the moving coil while the film is sucked.

4. The device acoerding to claim 2, further comprising a spring member for urging the moving coil toward the pressure plate.

5. The device according to claim 4, further comprising means for attracting the moving coil so that the moving coil is maintained at its rearmost position, wherein the actuator drive circuit provides a first pulse current to the moving coil to increase the volume of the closed variable space in response to a shutter release signal from a camera body, and a second pulse current having a direction opposite to that of the first pulse current to decrease the volume of the closed variable space in response to a shutter operation completion signal from the camera body.

6. The device according to claim 1, further comprising:
    data superimposing means for exposing the film to light which carries data to be superimposed on the film; and
    a control circuit for, in response to a shutter release signal from a camera body, effecting the data superimposing means and the actuator drive circuit, and for, in response to a shutter operation completion signal from the camera body, stopping an operation of the data superimposing means if the data superimposing operation has been completed.

7. The device according to claim 6, wherein the actuator drive circuit, the data superimposing means and the control circuit are provided on the side of a back cover of the camera.

8. The device according to claim 1, further comprising external air suction means for sucking air in the variable container, wherein it can be selected whether the film is sucked only by the electromagnetic actuator, only by the air suction means, or by both the electromagnetic actuator and the air suction means.

9. A film flatness keeping device for a camera, comprising:
- a pressure plate having one or a plurality of through-holes in its central portion, a film being placed on a front surface of the pressure plate;
- a variable container forming a closed variable space on the rear side the pressure plate, the variable container comprising the central portion of the pressure plate and a rubber member;
- a suction plate being integral with the rubber member and substantially in parallel with the pressure plate;
- a ferromagnetic drive plate disposed in the rear of the rubber member;
- a moving coil mounted on the drive plate at its rear side;
- a spring member for urging the drive plate toward the pressure plate;
- a magnetic circuit forming section comprising a fixed permanent magnet and an opening into which the moving coil can be inserted; and
- a suction drive circuit for driving the moving coil; wherein except during an exposure of the film, the drive plate is pressed against the rubber member by means of the spring member;

before start of the exposure, the suction drive circuit provides a first pulse current to the moving coil so as to increase a volume of the closed variable space to suck the film through the through-holes, and to stick the drive plate to the magnetic circuit forming section with a magnetic attraction force therebetween;

during the exposure, the drive plate is kept stuck to the magnetic circuit forming section with the magnetic attraction force; and after end of the exposure, the suction drive circuit provides a second pulse current having a direction opposite to that of the first pulse current to the moving coil so as to increase a magnetic gap between the drive plate and the magnetic circuit forming section to make the magnetic attraction force weaker than a repulsion force by the spring member, thereby returning the drive member to its original position.

* * * * *